United States Patent [19]

Marlowe

[11] Patent Number: 5,034,833
[45] Date of Patent: Jul. 23, 1991

[54] METHOD AND APPARATUS FOR LOADING DATA CARTRIDGE ABOUT TWO PIVOT AXES INTO CARTRIDGE DRIVE

[75] Inventor: Christian P. Marlowe, Nederland, Colo.

[73] Assignee: Exabyte Corporation, Boulder, Colo.

[21] Appl. No.: 433,962

[22] Filed: Nov. 9, 1989

[51] Int. Cl.⁵ .......................................... G11B 15/675
[52] U.S. Cl. ................... 360/96.5; 360/99.06
[58] Field of Search ............. 360/96.5, 96.6, 99.02, 360/99.03, 99.06, 99.07

[56] References Cited

U.S. PATENT DOCUMENTS

| | | | |
|---|---|---|---|
| 3,962,727 | 6/1976 | Kamimura | 360/85 |
| 4,072,988 | 2/1978 | Sato et al. | 360/96 |
| 4,257,075 | 3/1981 | Wysocki et al. | 360/96.5 |
| 4,357,639 | 11/1982 | Hama | 360/85 |
| 4,412,260 | 10/1983 | Stricklin et al. | 360/99.06 |
| 4,491,886 | 1/1985 | Saito | 360/85 |
| 4,614,991 | 9/1986 | Murakami | 360/96.5 |
| 4,620,245 | 10/1986 | Shimizu | 360/85 |
| 4,628,383 | 12/1986 | Miyamoto | 360/96.5 |
| 4,641,210 | 2/1987 | Ohyama | 360/96.5 |
| 4,642,714 | 2/1987 | Miyamoto | 360/96.5 |
| 4,654,731 | 3/1987 | Fröschl et al. | 360/96.5 |
| 4,680,654 | 7/1987 | Shibuya | 360/96.5 |
| 4,703,373 | 10/1987 | Oosaka | 360/99.06 |
| 4,786,011 | 11/1988 | Fujiwara | 242/195 |
| 4,796,115 | 1/1989 | Ohshima | 360/85 |

FOREIGN PATENT DOCUMENTS 0005457  1/1985  Japan .................... 360/96.5

Primary Examiner—John H. Wolff
Assistant Examiner—Craig A. Renner
Attorney, Agent, or Firm—Griffin, Branigan & Butler

[57] ABSTRACT

An apparatus (20) and method is provided for front loading of cartridge (100) of magnetic information storage medium into a read/write relationship with a read/write unit (32). The apparatus includes a cartridge-supporting tray (24) which is accommodated in a frame (22). A door (26) is pivotally connected to the frame (22) for enclosing the cartridge in a cavity (30) defined by the frame (22). The frame (22) has a pair of guide slots (62, 63) provided on opposing frame sidewalls. Orientation pins (60, 61) provided on the tray (24) extend through the guide slots (62,63). The guide slots (62, 63) define a path of travel for the tray (24) and the cartridge that includes counterclockwise motion about a first pivot point (64) followed by clockwise motion about a second pivot point (66). The drive door (26) has a linkage (70) which engages the tray orientation pins (60), whereby closing and opening the drive door (26) causes the dual pivoting action of the cartridge and tray into a fully loaded position.

7 Claims, 5 Drawing Sheets

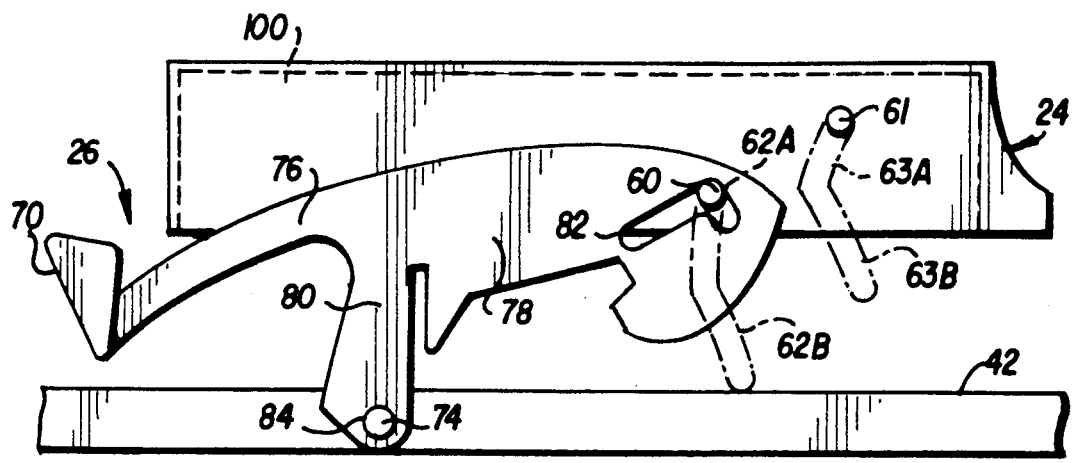
FIG. 8A
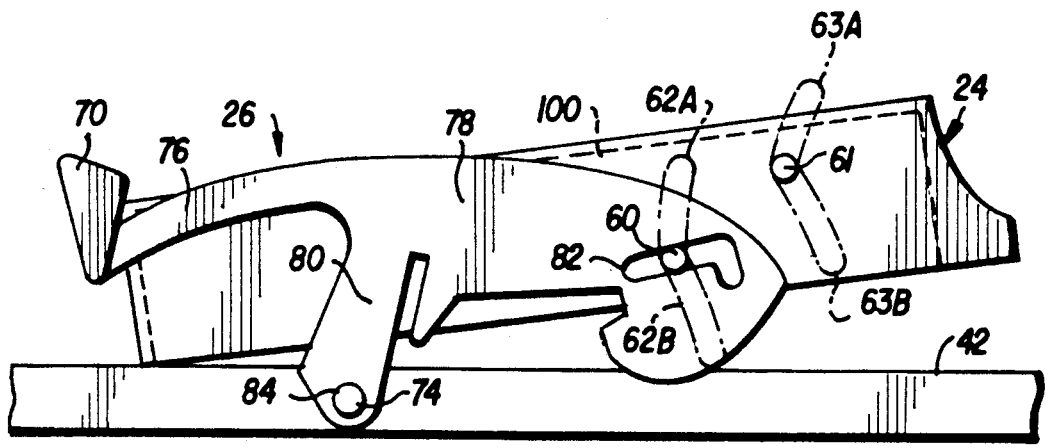
FIG. 8B
FIG. 8C
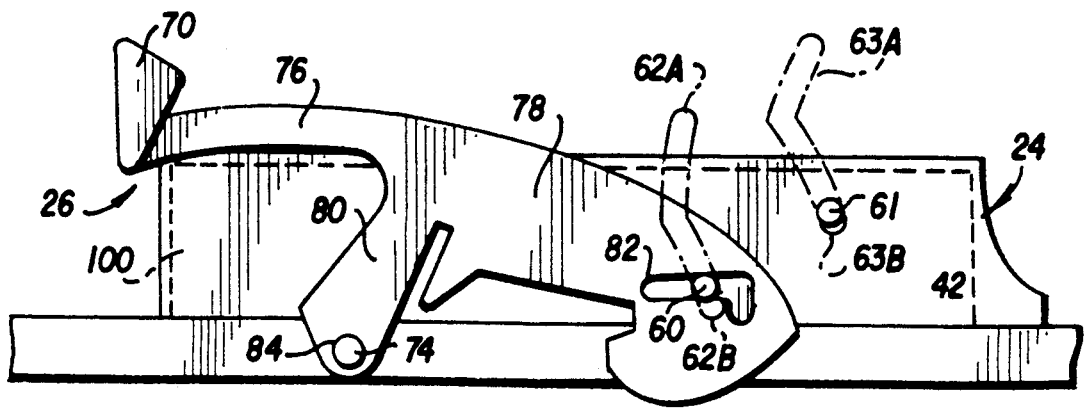

METHOD AND APPARATUS FOR LOADING DATA CARTRIDGE ABOUT TWO PIVOT AXES INTO CARTRIDGE DRIVE

BACKGROUND

1. Field of the Invention

This invention pertains to method and apparatus for loading cartridges into a tape deck or tape drive.

2. Prior Art and Other Considerations

Many diverse load mechanisms for tape cartridges currently exist. These mechanisms use various schemes for loading the tape cartridge onto a drive. However, in view of conventional restraints regarding the front surface area of the drive, none are capable of loading a tape cartridge onto a drive completely from the front.

Accordingly, it is an object of the present invention to provide method and apparatus for front loading of a tape cartridge into a cartridge drive.

SUMMARY

An apparatus and method is provided for front loading of cartridge of magnetic information storage medium into a read/write relationship with a read/write unit. The apparatus includes a cartridge-supporting tray which is accommodated in a frame. A door is pivotally connected to the frame for enclosing the cartridge in a cavity defined by the frame. The frame has a pair of guide slots provided on opposing frame sidewalls. Orientation pins provided on the tray extend through the guide slots. The guide slots define a path of travel for the tray and the cartridge that includes counterclockwise motion about a first pivot point followed by clockwise motion about a second pivot point. The drive door has a linkage which engages the tray orientation pins, whereby closing and opening the drive door causes the dual pivoting action of the cartridge and tray into a fully loaded position.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 8A is a right side view showing a loading tray and door member of the mechanism of FIG. 1 in a preliminary loading position;

FIG. 8B is a right side view showing a loading tray and door member of the mechanism of FIG. 1 in a tilted position;

FIG. 8C is a right side view showing a loading tray and door member of the mechanism of FIG. 1 in a fully loaded position; and,

DETAILED DESCRIPTION OF THE DRAWINGS

Figure 1:
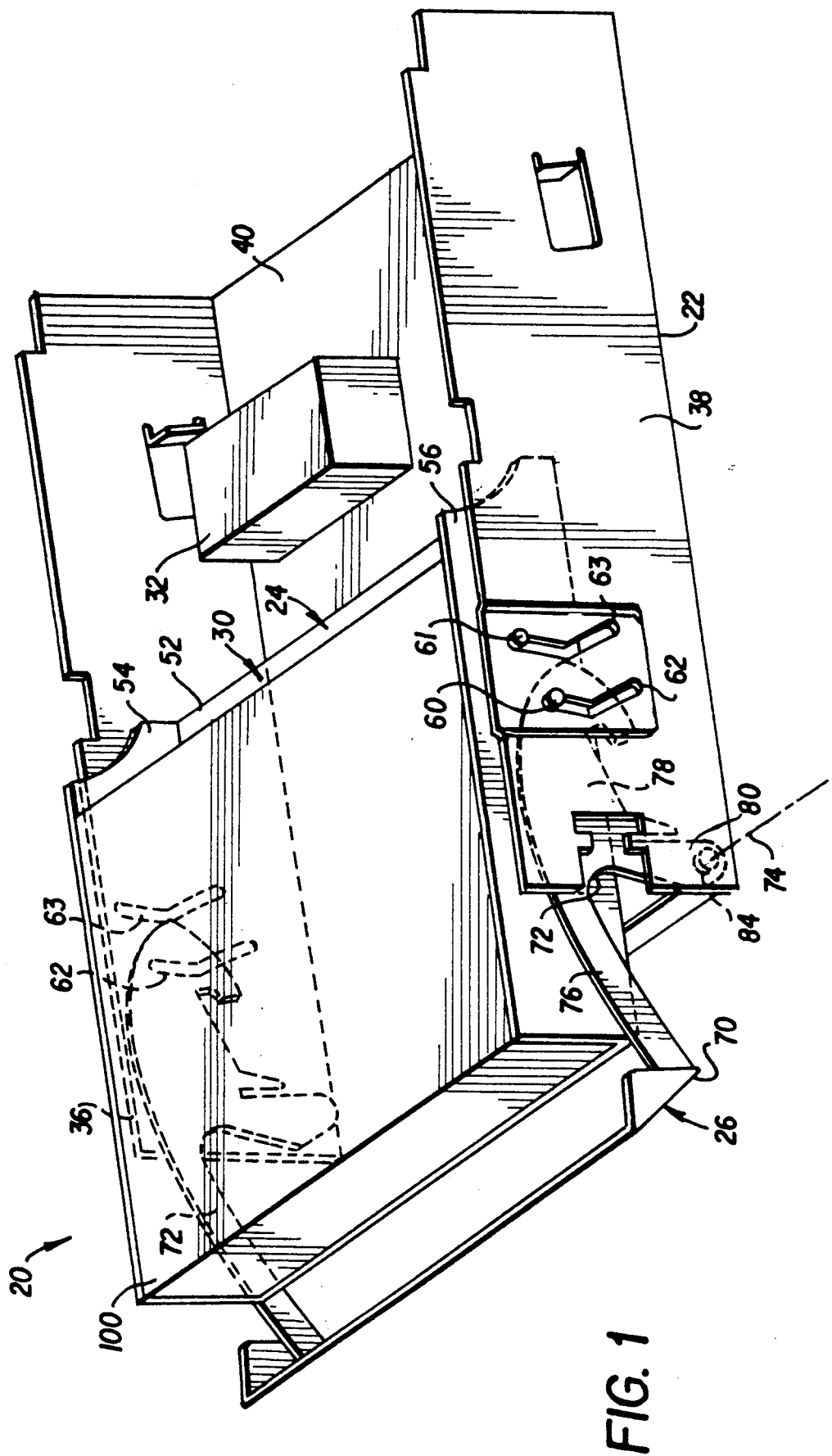
FIG. 1 is an isometric view showing a cartridge loading mechanism according to an embodiment of the invention.
Figure 2:
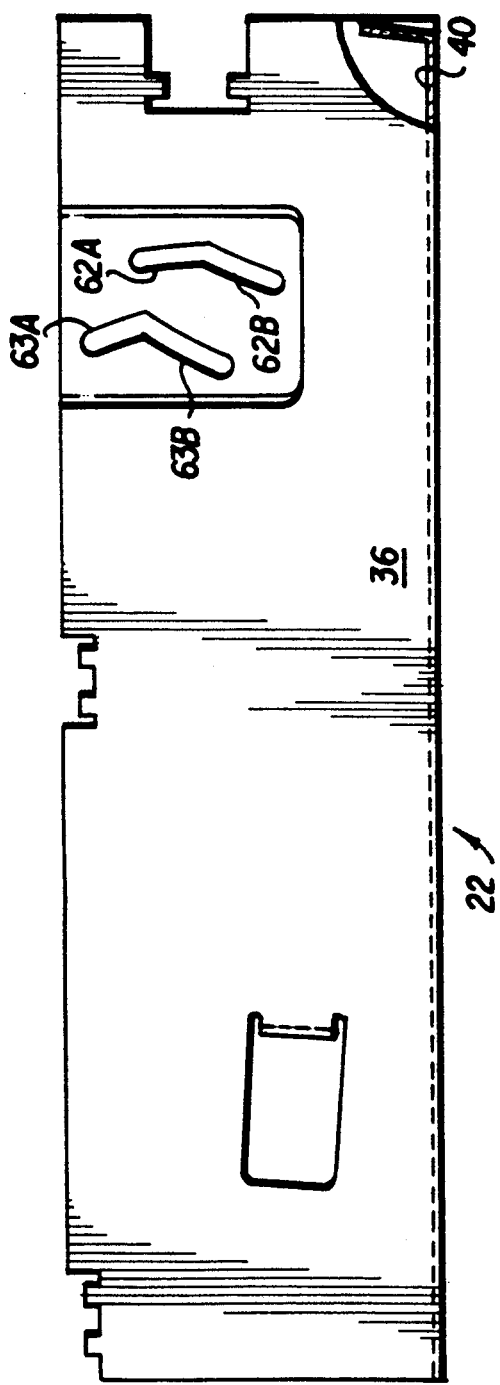
FIG. 2 is a left side view of a frame of the loading mechanism of the embodiment of FIG. 1.
Figure 3:
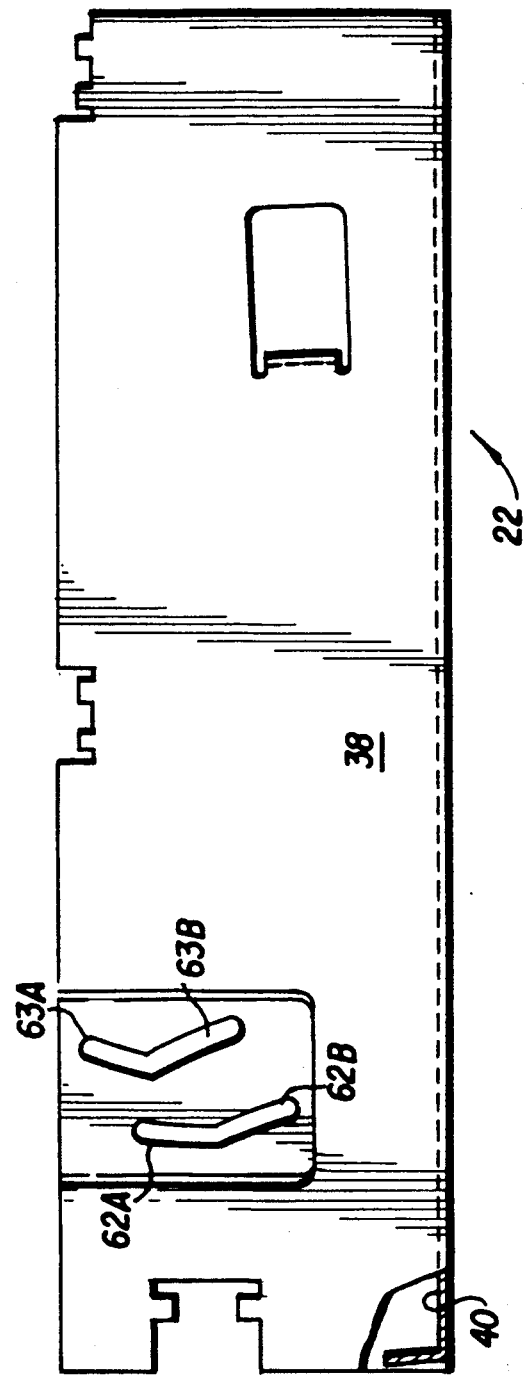
FIG. 3 is a right side view of a frame of the loading mechanism of FIG. 1.
Figure 4:
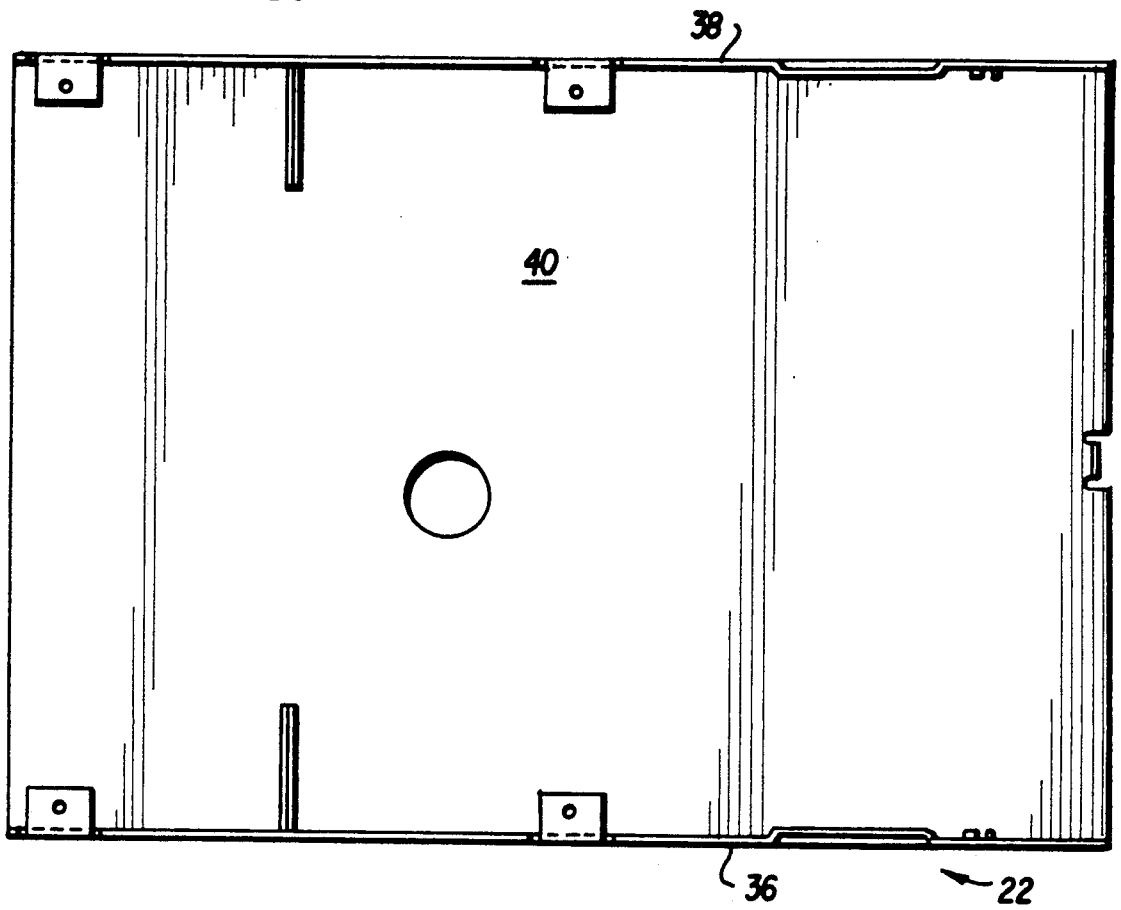
FIG. 4 is a top view of a frame of the loading mechanism of FIG. 1.

FIG. 1 shows a magnetic tape cartridge loading mechanism 20 for a 8 mm cartridge drive or deck. The loading mechanism 20 includes a loading frame 22; a loading tray 24; and, a drive door 26. As shown in FIGS. 1 through 6, the frame 22 is generally of a rectangular "U" shape. The frame 22 defines a cavity 30. A rearward portion of the cavity 30 accommodates an electronic read/write unit 32, which includes an unillustrated tape transport mechanism for transporting tape in the cartridge past a head in electronics unit 32.

As shown in FIGS. 1-6, the frame 22 has a left sidewall 36; a right sidewall 38; and, a bottom 40. Spaced above and parallel to the frame bottom 40 is a datum plane 42. As seen hereinafter, a cartridge 50 has a bottom surface thereof coplanar with datum plane 42 when the cartridge is in a fully loaded position.

The loading tray 24 is also of a rectangular "U"-shape and fits within a forward portion of the cavity 30; i.e. within the frame 22. The tray 24 has a tray bottom 52 and tray left and right sidewalls 54 and 56, respectively. As discussed in greater detail hereinafter, each sidewall 54, 56 of loading tray 24 has a pair of orientation pins 60, 61 formed thereon to extend laterally outward.

As shown in FIGS. 8, the first orientation pin 60 is formed forward and below the second orientation pin 61 on the tray sidewalls 54, 56.

Figure 7:
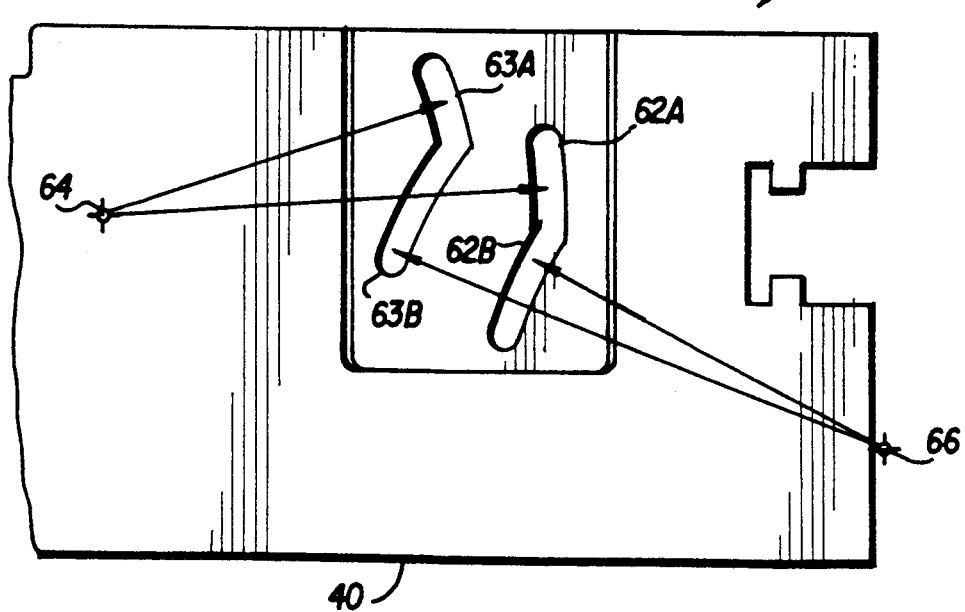
FIG. 7 is an enlarged partial left side view of a frame of the loading mechanism of FIG. 1.
Figure 5:
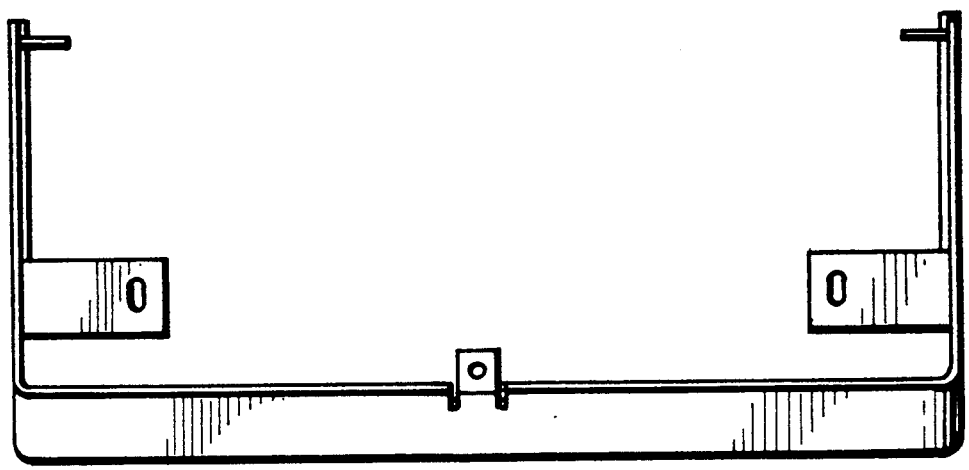
FIG. 5 is a front view of a frame of the loading mechanism of FIG. 1.
Figure 6:
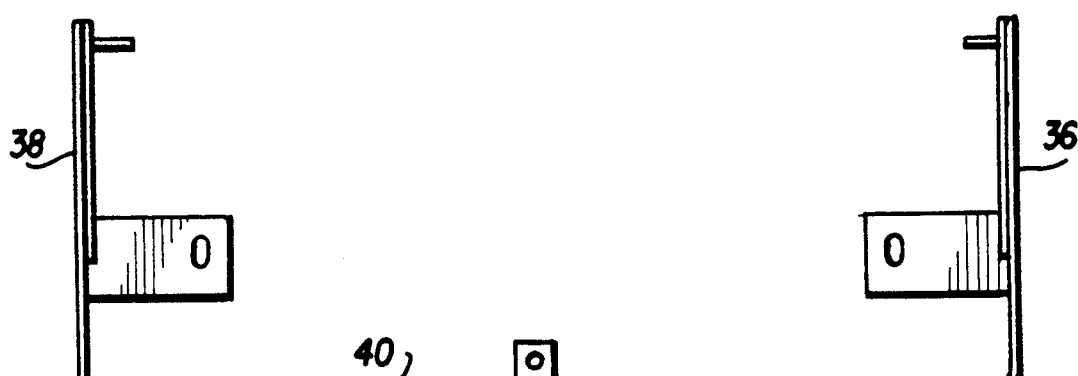
FIG. 6 is a rear view of a frame of the loading mechanism of FIG. 1.

The pins 60, 61 are positioned to extend through corresponding tray guide slots 62, 63 provided on sidewalls 36 and 38 of the frame 22. The tray guide slots 62, 63 are formed as two arcuate slot segments 62A, 63A and 62B, 63B. Slot segments 62A, 63A are radiused about a common pivot axis 64 (see FIG. 7) which extends laterally across the frame 22 just forward of the electronic read/write unit 32. Slot segments 62B, 63B which are continuously formed with respective segments 62A, 63A, are radiused about a pivot axis 66 which extends laterally across the frame 22 near the frame front.

The door 26 includes a door panel 70 which extends across the front of the drive. As shown in FIG. 8C, the door panel 70, when closed, lies in a plane that is essentially perpendicular to the datum plane 42. At opposite ends the door panel 70 has a door linkage 72 by virtue of which the door 26 pivots about a pivot axis 74. In this regard, door linkage 72 is three part structure having a first leg 76, a second leg 78, and a third leg 80. The first leg 76 connects to the door panel 70. The second leg 78 has a pin engagement slot 82 formed therein. The third leg 80 depends and bears a pivotal connector 84 at the door pivot axis 74.

The door linkage members 72 are interposed between respective sidewalls of the frame 22 and the tray 24. The orientation pins 60 extend through the pin engagement slot 82 formed in the linkage second leg 78.

FIGS. 8A-8C show how a cartridge 100 is inserted into a drive having the loading mechanism 20 of the invention. At first the cartridge 100 is slid onto the tray 24, which initially is oriented at a horizontal position spaced well above the datum plane 42, as shown in FIG. 8.

When a user begins to shut the drive door 26, the door 26 pivots in a clockwise sense about the door pivot axis 74. The pivoting motion of door 26 about axis 74 is transmitted to the tray 26, since tray pins 60 are engaged by slots 82 of linkage legs 78. Accordingly, pins 60 begin to travel downwardly in guide slots 62, and acquire a counter clockwise direction of travel (about axis 64) as the pins 60 travel through the slot segments 62A. Ultimately the front lower edge of the cartridge 100 contacts the datum plane 42. At this point the tray 26, and hence the cartridge 100, is tilted in a first direction. At this juncture, the orientation of the pins 60, 61 are as shown in FIG. 8B.

Further closing of the drive door 26 forces the tray orientation pins 60 into the slot second segments 62B. In traveling through slot segments 62B, the pins 60, and hence the tray 24, acquire a clockwise direction of travel about the pivot axis 66. Ultimately, the rear lower edge of the cartridge 100 also contacts the datum plane 40, with the result that the bottom of cartridge 100 lies flush (coplanar) with the datum plane. As shown in FIG. 8C, the bottom of the cartridge 100 is a major planar surface of the cartridge 100 (e.g., the largest planar dimension of the cartridge 100).

Removal of the cartridge 100 is accomplished by opening the drive door 26. Opening of the drive door 26 causes pivoting in a counterclockwise sense about the door pivot axis 74. Pivoting of the door 26 in a counterclockwise sense about axis 74 essentially reverses the steps of the loading operation described above.

Thus, the mechanism 20 works by first rotating the cartridge 100 around pivot point 64, until the front of the cartridge (furthest from the drum), touches down on the deck, and then by rotating the cartridge around point 66 until the cartridge is in contact with all of the cartridge mounting pads (datum points). This motion is facilitated by use of guides 62, 63 on each end of the cartridge which incorporate the circular sections around points 64 and 66. The tape protecting front lid is opened either by a passive stop, appropriately placed, or an active linkage. In either case, the lid is opened on the motion that pivots about point 66.

The removal of the cartridge is the reverse of the motion that loads the cartridge. The motion that ejects the cartridge from the mechanism 20 is facilitated by pushing down on the door 26 of the load mechanism when the cartridge is in the position furthest from the deck.

While the invention has been particularly shown and described with reference to the preferred embodiments thereof, it will be understood by those skilled in the art that various alterations in form and detail may be made therein without departing from the spirit and scope of the invention.

The embodiments of the invention in which an exclusive property or privilege is claimed are defined as follows:

1. A front-loading apparatus for inserting a cartridge of magnetic information storage medium into a read/write relationship with a read/write head; said apparatus comprising:
    a frame whereupon said head is mounted, said frame having a pair of opposed frame sidewalls for defining a cavity for accommodating said cartridge, said frame having a datum plane upon which a major planar surface of said cartridge lies when said cartridge is fully inserted into said frame, said datum plane being essentially perpendicular to said sidewalls, said frame also having a first pivot axis and a second pivot axis extending between said opposed frame sidewalls;
    a door pivotally connected to said frame for enclosing said cartridge in said cavity, said door having a door panel which lies in a plane essentially perpendicular to said datum plane when said door panel is closed;
    a tray for supporting said cartridge in said cavity, the tray having a pair of pins provided on opposite sides thereof; and,
    means for defining a path of travel for said tray, said path defining means comprising a pair of guide slots formed in each of the opposing frame sidewalls with each guide slot receiving one of said pins, each slot comprising two arcuate slot segments with a first segment of said slot having a radius centered at said first pivot axis and a second segment of said slot has a radius centered at said second pivot axis, whereby, upon closing of said door, said tray initially pivots in a first direction about said first pivot axis and subsequently pivots in a second direction about said second pivot axis before said tray and said major planar surface of said cartridge supported therein lie essentially flush with said datum plane.

2. The apparatus of claim 1, wherein said door engages said pin.

3. The apparatus of claim 2, wherein said door engages said pin of said tray for directing said tray to travel in said first direction.

4. Apparatus for inserting a cartridge of magnetic information storage medium into a read/write relationship with a read/write head; said apparatus comprising:
    a frame whereupon said head is mounted, said frame having two opposed frame sidewalls for defining a cavity for accommodating said cartridge, said frame sidewalls having a pair of spaced-apart path-defining slots provided therein including a forward path-defining slot and a rearward path-defining slot, said frame also having a first pivot axis and a second pivot axis extending between said opposed frame sidewalls;
    a tray for supporting said cartridge in said cavity, said tray having two opposed tray sidewalls, each of said tray sidewalls having a pair of orientation pins mounted thereon, a first of said orientation pins extending through said forward path-defining slot and a second of said orientation pins extending through said rearward path-defining slot;
    a door pivotally connected to said frame for enclosing said cartridge in said cavity, said door including a door linkage which engages one of said orientation pins provided on said tray whereby, upon closing of said door, said tray and cartridge supported thereby initially pivot in a first direction about said first pivot axis and subsequently pivot in a second direction about said second pivot axis as said cartridge is enclosed in said cavity; and,
    wherein said each of said slots comprises two slot segments, wherein both of said segments of said slots are arcuate, wherein first segments of said slots have radii centered at said first pivot axis and second segments of said slots have radii centered at said second pivot axis.

5. A front-loading apparatus for inserting a cartridge of magnetic information storage medium into a read/write relationship with a read/write head; said apparatus comprising:

a frame whereupon said head is mounted, said frame having two opposed frame sidewalls for defining a cavity for accommodating said cartridge, said frame sidewalls having a pair of path-defining slots provided therein, said frame having a datum plane upon which a major planar surface of said cartridge lies when said cartridge is fully inserted into said frame;

a tray for supporting said cartridge in said cavity, said tray having two opposed tray sidewalls, each of said tray sidewalls having a pair of orientation pins mounted thereon, said orientation pins extending through said path-defining slots provided in said frame, wherein each of said path-defining slots comprise two slot segments, wherein both of said segments of said slot are arcuate, wherein first segments of said slots have radii centered at a first pivot axis and second segments of said slots have radii centered at a second pivot axis, said first and second axes extending between said opposed sidewalls of said frame;

a door pivotally connected to said frame for enclosing said cartridge in said cavity, said door including a door panel and a door linkage, said door panel lying in a plane essentially perpendicular to said datum plane when said door panel is closed, said door linkage having a first leg connected to said door panel, a second leg pivotally connected to said frame, and a third leg having means for engaging an orientation pin provided on said tray, whereupon by the closing of said door, said tray and said major planar surface of said cartridge supported thereby are transported to lie flush with said datum plane.

6. The apparatus of claim 5, wherein the closing of said door causes said tray and said cartridge supported therein to first pivot in a first direction about said first pivot axis and subsequently to pivot in a second direction about said second pivot axis.

7. A front-loading apparatus for inserting a cartridge of magnetic information storage medium into a read/write relationship with a read/write head; said apparatus comprising:

a frame whereupon said head is mounted, said frame having a pair of opposed frame sidewalls for defining a cavity for accommodating said cartridge, said frame sidewalls having a pair of spaced-apart path-defining slots provided therein including a forward path-defining slot and a rearward path-defining slot, said frame also having a first pivot axis and a second pivot axis extending between said opposed frame sidewalls; said slots each comprising two slot segments, both of said segments of said slots being arcuate, first segments of said slots having radii centered at said first pivot axis and second segments of said slots having radii centered at said second pivot axis; said frame having a datum plane upon which a major planar surface of said cartridge lies when said cartridge is fully inserted into said frame, said datum plane being essentially perpendicular to said sidewalls;

a tray for supporting said cartridge in said cavity, said tray having two opposed tray sidewalls, each of said tray sidewalls having a pair of orientation pins mounted thereon, a first of said orientation pins extending through said forward path-defining slot and a second of said orientation pins extending through said rearward path-defining slot;

a door pivotally connected to said frame for enclosing said cartridge in said cavity, said door including a door panel and a door linkage, said door panel lying in a plane essentially perpendicular to said datum plane when said door panel is closed, said door linkage having a first leg connected to said door panel, a second leg pivotally connected to said frame, and a third leg having means for engaging one of said orientation pins provided on said tray, whereupon by the closing of said door, said tray and said major planar surface of said cartridge supported thereby initially pivot in a first direction about said first pivot axis and subsequently pivot in a second direction about said second pivot axis as said cartridge is enclosed in said cavity.

* * * * *